United States Patent [19]

Matsuda et al.

[11] Patent Number: 5,389,002
[45] Date of Patent: Feb. 14, 1995

[54] CONNECTOR APPARATUS USED FOR A FLEXIBLE CABLE

[75] Inventors: Kozo Matsuda, Nagoya; Hidenobu Kazita, Okazaki; Masayasu Teraoka, Chiryu, all of Japan

[73] Assignee: Nippondenso Co., Ltd., Kariya, Japan

[21] Appl. No.: 169,140

[22] Filed: Dec. 20, 1993

[30] Foreign Application Priority Data

| Dec. 22, 1992 | [JP] | Japan | 4-356688 |
| Feb. 17, 1993 | [JP] | Japan | 5-027829 |
| Apr. 26, 1993 | [JP] | Japan | 5-099505 |
| Jul. 21, 1993 | [JP] | Japan | 5-179659 |
| Jul. 21, 1993 | [JP] | Japan | 5-180099 |

[51] Int. Cl.⁶ .............................. H01R 39/02
[52] U.S. Cl. ...................... 439/164; 439/15
[58] Field of Search ........................ 439/15, 164

[56] References Cited

U.S. PATENT DOCUMENTS

| 4,875,860 | 10/1989 | Suzuki | 439/15 |
| 5,066,239 | 11/1991 | Bannai et al. | 439/15 X |
| 5,314,341 | 5/1994 | Kazita et al. | 439/15 |

FOREIGN PATENT DOCUMENTS

| 419980 | 1/1992 | Japan . |
| 539044 | 2/1993 | Japan . |
| 553100 | 5/1993 | Japan . |

Primary Examiner—Eugene F. Desmond
Attorney, Agent, or Firm—Cushman Darby & Cushman

[57] ABSTRACT

A cable connector apparatus comprises a case, defining first (6) and second compartments (10) therein; a rotary member (1) accommodated in the first compartment (6); a stationary member (3) accommodated in the second compartment (6); a flexible cable (7) having one end connected to the rotary member (1) and the other end connected to the stationary member (3), the flexible cable (7) being wound around both the rotary member (1) and stationary member (3) plural times so as to allow the rotary member (1) to turn on its axis several times; an auxiliary rotary member (2) disposed around and radially spaced from the stationary member (3), the auxiliary rotary member (2) having an engaging mechanism establishing engagement between the auxiliary rotary member (2) and the flexible cable (7); the second compartment (10) being separated into two spaces by the auxiliary rotary member (2), thereby dividing a flexible cable accommodated in the second compartment (10) into inner and outer portions; and an elastic force assist means (5) associated with the auxiliary rotary member (2) so as to generate elastic force in response to rotation of the auxiliary rotary member (2).

27 Claims, 13 Drawing Sheets

CONNECTOR APPARATUS USED FOR A FLEXIBLE CABLE

BACKGROUND OF THE INVENTION

1. Field of the Invention

The present invention relates to a connector apparatus used for a flexible cable, and more particularly to a connecting apparatus used for the electric wire harness disposed between a steering wheel and a steering column of an automotive vehicle.

2.1. Prior Art

A conventional cable connector apparatus used for connecting the steering wheel and the steering column, disclosed for example in the Unexamined Japanese Patent Application No. HEI 4-19980/1992 and the Unexamined Japanese Patent Application No. HEI 5-39044/1993, has a small-diameter stationary member fixed to the steering column and a large-diameter rotary member fixed to the steering wheel. A flat cable is connected to the small-diameter stationary member at one end thereof and is connected to the large-diameter rotary member at the other end thereof.

In this kind of cable connector apparatus, an inside space of the casing is usually large enough to allow the flat cable to expand due to flexibility when this flat cable is unwound. However, the flat cable dose not always expand coaxially with an axis of the stationary member. That is, the flat cable tends to cause eccentric expansion around the stationary member in the unwound condition. If the radially outermost periphery end of the flat cable offsets too much toward one particular direction due to this eccentric expansion, the flat cable possibly causes frictional engagement or interference with the inside wall of the casing. This frictional engagement or interference is of course undesirable in properly winding the flat cable around the stationary member. Consequently, the flat cable is likely to cause unwanted permanent buckling.

2.2. Previously Proposed Art:

To solve above problem, the applicant of this application has already proposed a connector apparatus used for a steering apparatus in an automotive vehicle, recently applied for a patent to the Japanese Patent Office and is numbered as Japanese Patent Application No. HEI 5-53100/1993 which is not yet opened to the public. As shown in FIG. 10, this steering connector apparatus comprises a rotary member 35, a stationary member 36, a flat cable 37 having one end connected to the movable member 35 and the other end connected to the stationary member 36, and a casing 38 accommodating these members 35, 36, and 37 therein. The flat cable 37 is wound around both the movable member 35 and the stationary member 36 plural times.

To solve the problem encountered in the above-described conventional cable connector apparatus, the cable connector apparatus proposed by the applicant of the present application disposes the stationary member 36 at a position offset from the center 39 of the inside space of the casing 38 close to the cable passage, so that the offset direction becomes normal to the pulling-out direction of the flat cable.

However, longstanding usage of the flat cable in such a cable connector apparatus will inevitably cause permanent winding deformation of the flat cable. Therefore, the expanding direction of the flat cable 37 when unwound around the stationary member 36 and the rotary member 37 will be unexpectedly varied from the initial condition.

If the expanding direction of the flat cable 37 once varies largely due to aging effect, the flat cable 37 will be unable to avoid interference with the inside wall of the casing 38. And, therefore, the flat cable 37 will be fatally buckled. Thus, the above-described eccentric arrangement of the stationary shaft will be no longer effective against the longstanding usage of the flat cable.

SUMMARY OF THE INVENTION

Accordingly, in view of above-described problems encountered in the background art, an object of the present invention is to provide a connector apparatus capable of avoiding buckling of the flexible cable regardless of its kind and also realizing smooth winding of the flexible cable.

In order to accomplish the above purpose, a first aspect of the present invention provides a cable connector apparatus comprising:

a case, defining first and second compartments therein;

a rotary member accommodated in the first compartment;

a stationary member accommodated in the second compartment;

a flexible cable having one end connected to the rotary member and the other end connected to the stationary member, the flexible cable being wound around both the rotary member and stationary member plural times so as to allow the rotary member to turn on its axis several times;

an auxiliary rotary member disposed around and radially spaced from the stationary member, the auxiliary rotary member having an engaging mechanism establishing engagement between the auxiliary rotary member and the flexible cable;

the second compartment being separated into two spaces by the auxiliary rotary member, thereby dividing a flexible cable accommodated in the second compartment into inner and outer portions; and an elastic force assist means associated with the auxiliary rotary member so as to generate elastic force in response to rotation of the auxiliary rotary member.

It will be preferable in the above first aspect of the present invention that the elastic force assist arrangement comprises an elastic member wound around the stationary member and the elastic member causes elastic force to turn the auxiliary rotary member, thereby surely winding the flexible cable around the auxiliary rotary member when the flexible cable is unwound.

In accordance with the above first aspect of the present invention, the auxiliary rotary member causes autorotation on its axis in the same direction as the flexible cable in response to the wind or unwind motion of the flexible cable. And, the elastic force assist arrangement (elastic member) gives elastic force to the auxiliary rotary member to assist the autorotation motion, thereby ensuring that the flexible cable is wound around the auxiliary rotary member appropriately.

Furthermore, it will be preferable that the engaging mechanism of the present invention comprises a hole formed on the auxiliary rotary member, through which the flexible cable extends from inside to outside of the auxiliary rotary member.

Still further, it will be preferable that the auxiliary rotary member of the present invention has upper and lower circular bearings, and the second compartment has upper and lower circular ridges which are loosely coupled with the upper and lower circular bearings of the auxiliary rotary member, respectively. On the contrary, the auxiliary rotary member may have upper and lower circular ridges. In this case, the second compartment has upper and lower circular bearings which are loosely coupled with the upper and lower circular ridges of the auxiliary rotary member.

More specifically, the auxiliary rotary member has a cylindrical body. The elastic force assist means is a flat spiral spring having one end connected to the stationary member and the other end connected to the auxiliary rotary member. This flat spiral spring is disposed along the flexible cable inside the auxiliary rotary member.

A disk-like flange is provided inside the cylindrical body so as to protrude inward from the cylindrical body, thereby dividing an inside space of the auxiliary rotary member into upper and lower rooms. The flexible cable is housed in one of the upper and lower rooms and the spiral spring is housed in the other of the upper and lower rooms.

A ringed flange is further provided outside the cylindrical body so as to protrude outward from the cylindrical body, thereby dividing both an outside space and an inside space of the auxiliary rotary member into upper and lower rooms, respectively.

Furthermore, in accordance with a second aspect of the present invention, there is provided an improved cable extracting mechanism. Namely, the flexible cable has an extended portion extracted out of the casing of the cable connector apparatus to serve as a connecting cable, and the connecting cable has a coupler at the remote end thereof. There is provided a slit-like extracting hole on the cylindrical body of the stationary member. The slit-like extracting hole extends in an axial direction of the cylindrical body of the stationary member. The connecting cable is split into a plurality of slender cables, and each of these slender cables is bent downward with respect to the flexible cable extending horizontally. Then, these slender cables are superposed in the slit-like extracting hole. There is further provided a cover plate defining a cable extracting passage, which is slidably coupled in guide grooves formed on a bottom of the casing. This cover plate has one end located beneath a lower end opening of the slit-like extraction hole and the other end serving as an outlet of the cable extracting passage. Thus, the connecting cable is extracted through the slit-like extracting hole and the cover plate. It will be preferable that the cylindrical body of the stationary member is roundly curved at an inlet of the slit-like extracting hole.

The cylindrical body may be integrally formed with a circular base plate serving as a bottom of the second compartment, so that the cylindrical body protrudes upwardly from a center of the circular base plate. Preferably, this circular base plate has a cutout extending radially and continuously from the slit-like extraction hole.

Moreover, a third aspect of the present invention makes the installation of cable easy. Because, the flexible cable has a mark thereon for discriminating a predetermined position of the flexible cable and the case has a transparent window through which the mark is monitored.

Yet further, a fourth aspect of the present invention provides an improved cable connecting structure. Namely, the flexible cable accommodates a plurality of conductors extending in parallel with each other in a longitudinal direction of the flexible cable. A plurality of terminals are provided as many as the conductors of the flexible cable. These terminals extend in parallel with each other in a direction different from the longitudinal direction of the flexible cable. An insulating sheet interposes between the conductors of the flexible cable and the terminals. The insulating sheet has a plurality of holes opened thereon through which the conductors of the flexible cable are connected with corresponding terminals.

Or, the insulating sheet may be disposed under the conductors of the flexible cable and the terminals. In this case, the insulating sheet has holes located beneath the conductors and terminals. A connecting lead is provided under the insulating sheet. The connecting lead has both ends received by the holes, thereby electrically connecting each one of the conductors with its corresponding terminal.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
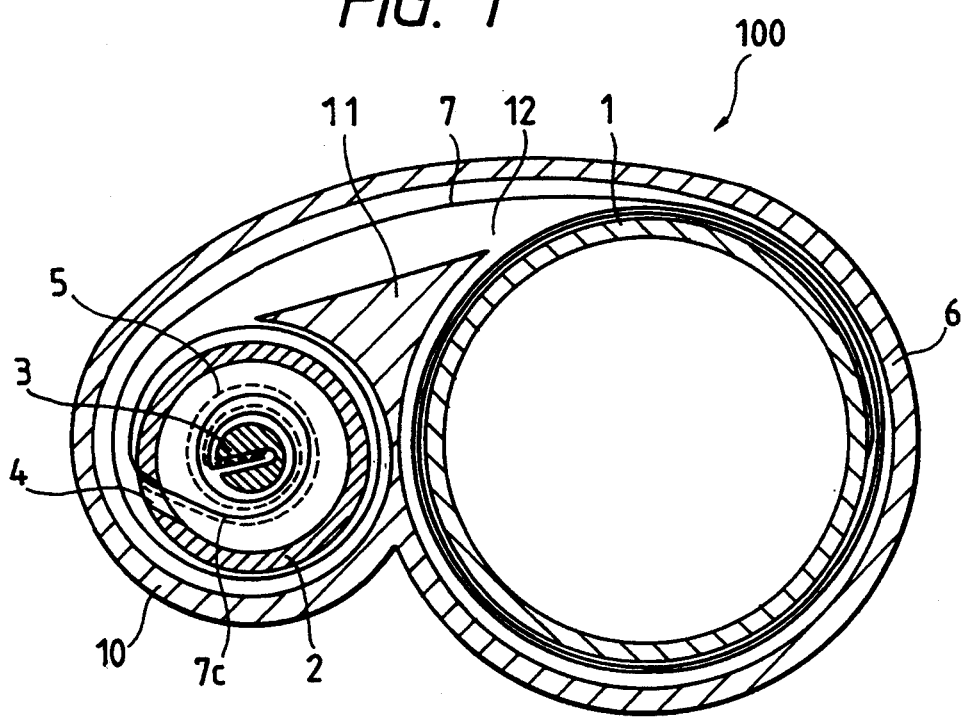
FIG. 1 is a horizontal cross-sectional view showing a connector apparatus in accordance with one embodiment of the present invention, wherein a flat cable is tightly wound up in the clockwise direction.
Figure 2:
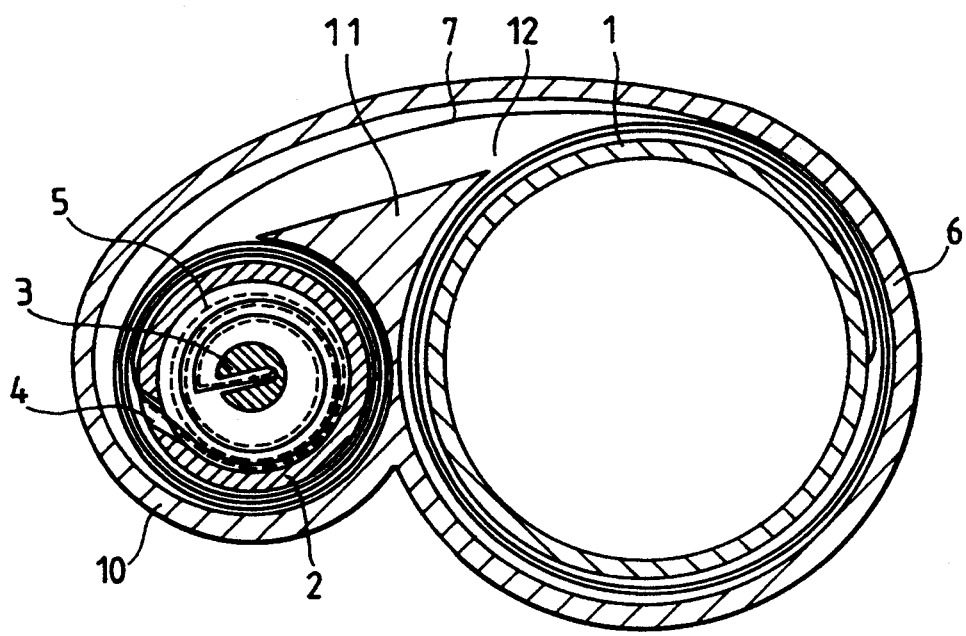
FIG. 2 is a horizontal cross-sectional view showing the connector apparatus of FIG. 1, wherein the flat cable is loosely unwound in the counterclockwise direction.
Figure 4:
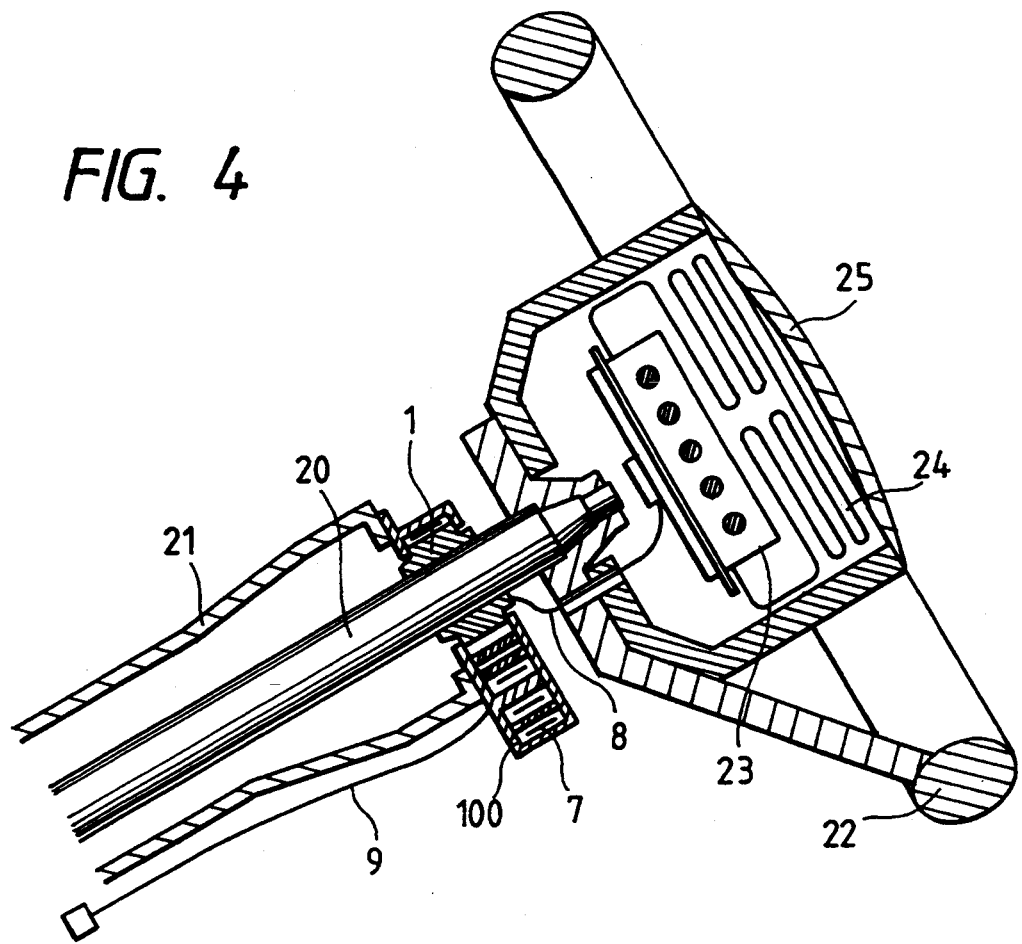
FIG. 4 is a vertical cross-sectional view showing the connecting apparatus of the present invention installed around a steering apparatus of an automotive vehicle.
Figure 5:
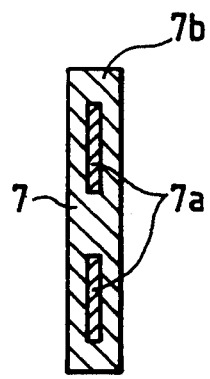
FIG. 5 is a vertical cross-sectional view showing one example of the flat cable.

Hereinafter, a preferred embodiment of the present invention will be explained in detail with reference to the accompanying drawings. In this embodiment, the present invention is applied to the connector apparatus of the electric wire harness connecting an air bag and a vehicle battery. The air bag is a device qualifying as a passenger safeguard equipment. FIGS. 1 and 2 illustrate the structure of the connector apparatus in accordance with one embodiment of the present invention. FIG. 4 illustrates the connector apparatus installed around the steering apparatus of an automotive vehicle.

In FIG. 4, a steering shaft 20 is housed in a casing 21. An upper end of the steering shaft 20 is connected to a steering wheel 22. A rotary member 1 has a cylindrical shape and is secured to this steering shaft 20 at an upper end of the casing 21. This rotary member 1 constitutes a part of the connector apparatus 100. This rotary member 1 causes rotation in response to a turning movement of the steering wheel 22.

The steering wheel 22 has a pad 25 on the central top thereof. An air bag 24 is installed under this pad 25. There is further provided an inflator 23 beneath the air bag 23. This inflator 23 comprises an ignitor and gas supplying agent, and serves as a gas generator for quickly expanding the air bag in case of collision accident of the automotive vehicle. This inflator 23 is electrically connected to the connector apparatus 100 through a first connecting cable 8 and a first coupler 51. (See FIG. 11)

A flat cable 7 accommodated in the connector apparatus 100 is a flexible cable. The connector apparatus is electrically connected to a vehicle battery (not shown) via a second connecting cable 9 and second couplers 52 and 53. In this manner, electric power is supplied from the vehicle battery to the inflator 23 through the first and second connecting cables 8,9, the first and second couplers 51, 52, 53, and the flat cable 7.

Next, an operation of the above embodiment will be explained.

If the collision of the vehicle is detected, a collision signal is generated upon detection of the collision. This collision signal is immediately transmitted to the inflator 23 via the second connecting cable 9, the connector apparatus 100, and the first connecting cable 8. Then, in response to this collision signal, the inflator 23 suddenly generates a great amount of gas. The air bag 24 receives the gas and quickly inflates to break open the pad 25, expanding in front of a driver of the automotive vehicle. Thus, the air bag 24 safeguards the driver.

Next, the connector apparatus 100 in accordance with the present invention will be explained. FIG. 1 is a horizontal cross-sectional view showing the connector apparatus 100, wherein the flat cable 7 is tightly wound up in the clockwise direction. FIG. 2 is a horizontal cross-sectional view showing the connector apparatus 100, wherein the flat cable 7 is loosely unwound in the counterclockwise direction.

The connector apparatus 100 comprises the rotary member 1 which secures the steering shaft 20 and causes rotation in response to the turning motion of the steering wheel 22; a first compartment 6 having a smooth inside wall disposed around and radially spaced from the rotary member 1; the flat cable 7 (equivalent to the flexible cable) having one end being wound around the rotary member 1; a stationary member 3 winding the other end of the flat cable 7; a second compartment 10 having a smooth inside wall disposed around and radially spaced from the stationary member 3; an auxiliary rotary member 2 interposed between the stationary member 3 and the inside wall of the second compartment 10 and being radially spaced from these two so as to rotate coaxially with the stationary member 3; a flat spiral spring 5 (equivalent to the elastic member) associated with the auxiliary rotary member 2 and generating elastic force in response to the rotation of the auxiliary rotary member 2 with respect to the stationary member 3; and a cable passage 12 defined by a surrounding wall 11.

As shown in FIG. 1, the stationary member 3 has a diameter smaller than that of the rotary member 1. A clearance between the outer peripheral surface of the stationary member 3 and the inner peripheral surface of the auxiliary rotary member 2 is set large enough to allow the flat cable 7 to be wound up or unwound around the stationary member 3 freely. On the contrary, a clearance between the outer peripheral surface of the rotary member 1 and the inside wall of the first compartment 6 is set relatively small in order to prevent the flat cable 7 from expanding excessively when it is unwound and to surely guide it toward the second compartment 10. The stationary member 3 is located at substantially the center of the second compartment.

The flat cable 7 consists of a plurality of flat conductors 7a and 7a, disposed in parallel with each other in the longitudinal direction, and a flat synthetic resin insulator 7b surrounding these conductors 7a and 7a. One end of this flat cable 7 is connected to the rotary member 1 and the other end of this flat cable 7 is also connected to the stationary member 3. The number of the conductors 7a, 7a is not limited to two.

The wall 11, provided to define the cable passage 12, serves as a guide means for guiding the flat cable 7 to the first 6 or the second compartment 10. Furthermore, this wall 11 has a function to suppress buckling of the flat cable 7. The buckling is normally generated between the rotary member 1 and the stationary member 3. However, this wall 11 can effectively narrow the space to suppress an excessive movement of the flat cable 7.

The auxiliary rotary member 2 has a ring shape, and has a through hole 4 thereon. A part of the flat cable 7 passes through this through hole 4. Namely, the flat cable 7 is wound around the stationary member 3 plural times inside the auxiliary rotary member 2, and guided to the outside of auxiliary rotary member 2 via the through hole 4 of the auxiliary rotary member 2. Then, the flat cable 7 is guided to the rotary member 1 through the cable passage 12. With this arrangement, frictional engagement between the auxiliary rotary member 2 and the flat cable 7 can be established.

The number of turns of the flat cable 7 and the spiral spring 5, wound around the stationary member 3 and disposed inside the auxiliary rotary member 2, can be determined in the following manner. Let us assume that several parameters are defined as follows.

N: a rotational number of the auxiliary rotary member 2 corresponding to the required turning number of the rotary member 1.

$n_1$: number of turns of the flat cable 7 and the spiral-spring 5 disposed inside the auxiliary rotary member 2 when these flat cable 7 and spiral spring 5 are wound up tightly inside the auxiliary rotary member 2.

$n_2$: number of turns of the flat cable 7 and the spiral spring 5 disposed inside the auxiliary rotary member 2 when these flat cable 7 and spiral spring 5 are unwound loosely inside the auxiliary rotary member 2.

Using above parameters, the required rotational number N is expressed in the following equation.

$$N = n_1 - n_2 \tag{1}$$

Furthermore, assuming that the flat cable 7 has a thickness of $t_1$ and the spiral spring 5 has a thickness of $t_2$, an overall thickness t is expressed as follows.

$$t = t_1 + t_2 \tag{2}$$

Using these two equations (1) and (2), and taking account of an outer diameter $d_1$ of the stationary member 3 and an inner diameter $d_2$ (corresponding to an outer diameter of the flat cable 7 and the spiral spring 5 when tightly wound up inside the auxiliary rotary member 2), the numbers of turns of the flat cable 7 and the spiral spring 5 can be determined.

Namely, the numbers of turns of the flat cable 7 and the spiral spring 5 are determined in such a manner that the flat cable 7 and the spiral spring 5 can be wound up tightly and unwound loosely sufficiently in a space inside the auxiliary rotary member 2 in response to the rotations of the auxiliary rotary member 2 corresponding to the required maximum turning number of the rotary member 1 (equivalent to the turning number of the steering shaft 20).

The flat spiral spring 5 has one end fixed to the stationary member 3 and the other end fixed to the auxiliary rotary member 2 in the vicinity of the through hole 4. This spiral spring 5 is disposed along the flat cable 7 disposed in the auxiliary rotary member 2.

Figure 3:
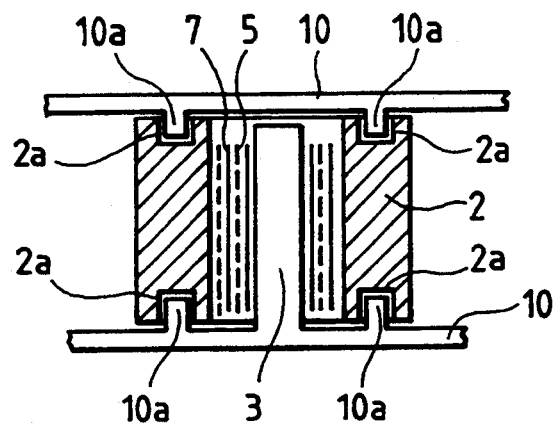
FIG. 3 is an enlarged, vertical, cross-sectional view showing an auxiliary rotary member used in the connector apparatus of the present invention.

As shown in FIG. 3, the auxiliary rotary member 2 has upper and lower circular bearings (i.e. grooves) 2a and 2a. The second compartment 10 has upper and lower circular ridges 10a and 10a, which are loosely coupled with the bearings 2a and 2a of the auxiliary rotary member 2. Thus, the auxiliary rotary member 2 can cause autorotation on its axis with respect to the stationary member 3 and the second compartment 10.

The first connecting cable 8 has one end electrically connected to the first coupler 51 and the other end connected to the rotary member 1. The second connecting cable 9 has one end electrically connected to the second couplers 52 and 53 and the other end connected to the stationary member 3.

Next, an operation of the connector apparatus 100 above described will be explained. When the steering wheel 22 is turned in the clockwise direction from its neutral position, the rotary member 1 causes rotation in the same direction in response to the turning motion of the steering wheel 22. Thus, the flat cable 7 is wound around the rotary member 1. Subsequently, the flat cable 7 surrounding the auxiliary rotary member 2 is pulled out through the cable passage 12 and wound around the rotary member 1. The flat cable 7 is, therefore, partly transferred from the second compartment 10 to the first compartment 8.

Next the flat cable 7, loosely wound around the auxiliary rotary member 2, is pulled out and wound up around the rotary member 1. In response to this pulling out motion of the flat cable 7, the auxiliary rotary member 2 causes rotation in the clockwise direction coaxially with the stationary member 3. Consequently, the flat cable 7 and the spiral spring 5 disposed inside the auxiliary rotary member 2 are gradually wound up tightly around the stationary member 3, as shown in FIG. 1.

On the other hand, if the steering wheel 22 is turned in the opposite (i.e. counterclockwise) direction from the wind-up position, the rotary member i causes reverse rotation in the counterclockwise direction in response to the returning motion of the steering wheel 22. Accordingly, the flat cable 7 is unwound from the rotary member 1.

In this case, the spiral spring 5 disposed inside the auxiliary rotary member 2 produces elastic restoring force in the counterclockwise direction since the spiral spring 5 is released from tightly wound-up condition.

Therefore, when the flat cable 7 is unwound from the rotary member 1, the auxiliary rotary member 2 causes reverse rotation on its axis in the counterclockwise direction at a predetermined position defined by the ridges 10a and 10a of the second compartment 10. In response to this reverse rotation of the auxiliary rotary member 2, the flat cable 7 is returned through the cable passage 12 into the second compartment 10 and wound up around the auxiliary rotary member 2. At the same time, the flat cable 7 and the spiral spring 5 disposed inside the auxiliary rotary member 2 are gradually unwound from the stationary member 3 as shown in FIG. 2.

In this manner, by loosely coupling the bearings 2a and 2a of the auxiliary rotary member 2 with the ridges 10a and 10a of the second compartment 10, the auxiliary rotary member 2 can cause autorotation on its axis at the predetermined position defined by these bearings 2a, 2a and ridges 10a, 10a. Furthermore, when the flat cable 7 is unwound after wound up tightly around the rotary member 1, the auxiliary rotary member 2 causes rotation by the elastic restoring force of the spiral spring 5 and therefore the loosed flat cable 7 is surely wound around the auxiliary rotary member 2.

Accordingly, even if the flat cable 7 has low elasticity or its elasticity is deteriorated due to thermal deformation under high temperature or aging effect, the auxiliary rotary member 2 is forcibly rotated in the direction opposite to the winding-up direction. Therefore, the loosely unwound cable 7 is surely wound around the auxiliary rotary member 2 at the predetermined position defined by the ridges 10a and 10a of the second compartment 10.

As described above, in accordance with the embodiment of the present invention, there are provided the auxiliary rotary member 2 and the spiral spring 5. With this arrangement, when the flat cable 7 is unwound, the auxiliary rotary member 2 can cause autorotation by the elastic force of the spiral spring 5; thus, the flat cable 7 is wound around the rotating auxiliary rotary member 2.

Accordingly, it becomes possible to execute the winding-up operation appropriately at the same position regardless of the kind of the flat cable 7. Consequently, the buckling of the flat cable 7 can be surely prevented and therefore the flat cable 7 can be smoothly wound up around the rotary member 1.

Figure 6:
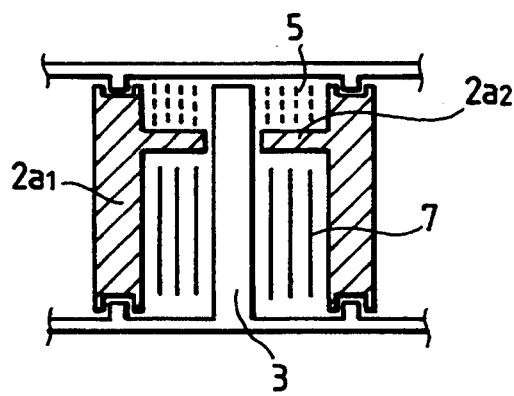
FIG. 6 is an enlarged, vertical, cross-sectional view showing another auxiliary rotary member used in the connector apparatus of the present invention.

Next, another embodiment of the auxiliary rotary member will be explained with reference to FIG. 6. Equivalent parts as those disclosed in FIGS. 1-3 are denoted by identical reference numerals in FIG. 6. FIG. 6 is a cross-sectional view showing another example of the auxiliary rotary member 2 in accordance with the present invention. This embodiment is characterized in that a disk-like flange $2a_2$ is provided integrally with a cylindrical body $2a_1$ of the auxiliary rotary member 2 so as to continuously protrude inside the cylindrical body $2a_1$ horizontally inwardly from the cylindrical body $2a_1$. This disk-like flange $2a_2$ divides the inside space of the auxiliary rotary member 2 into upper and lower rooms. This constitution allows the flat spiral spring 5 and the flat cable 7 to be separately housed. For example, as shown in FIG. 6, the flat spiral spring 5 is disposed in the upper room and the flat cable 7 is housed in the lower room. In this case, the flat spiral spring 5 is connected to the stationary member 3 at one end and connected to the cylindrical body $2a_1$ of the auxiliary rotary member 2 at the other end.

This embodiment not only brings the effect obtained in the above-described embodiment but realizes size reduction in the diameter of the auxiliary rotary member 2. The number of turns of the spiral spring 5 disposed inside the auxiliary rotary member 2 according to this embodiment can be calculated by substituting 0 for $t_1$ in the above equation (2). The number of turns of the spiral spring 5 thus obtained will become substantially the same as the number of the turns of the flat cable 7 disposed inside the auxiliary rotary member 2.

Figure 7:
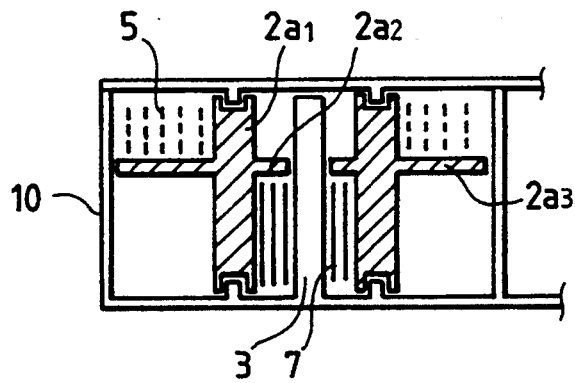
FIG. 7 is an enlarged, vertical, cross-sectional view showing still another auxiliary rotary member used in the connector apparatus of the present invention.

Next, still another embodiment of the auxiliary rotary member will be explained with reference to FIG. 7. Equivalent parts as those disclosed in FIGS. 1-3 are denoted by identical reference numerals in FIG. 7. FIG. 7 is a cross-sectional view showing still another example of the auxiliary rotary member 2 in accordance with the present invention. This embodiment is different from the embodiment of FIG. 6 in that a ringed flange $2a_3$ is further provided integrally with the cylindrical body $2a_1$ so as to protrude horizontally outwardly from the cylindrical body $2a_1$.

This arrangement further increases flexibility in layout of the spiral spring 5 and the flat cable 7 in the second compartment 10. For example, as shown in FIG. 7, the flat spiral spring 5 is disposed in the upper room outside the cylindrical body $2a_1$ and the flat cable 7 is housed in the lower room inside the cylindrical body $2a_1$. In this case, the flat spiral spring 5 is connected to the stationary member 3 at one end and connected to the second compartment 10 at the other end. With this arrangement, the same effect as the above embodiments can be obtained.

Figure 8:
FIG. 8 is a view showing a sample of a spiral spring.

Although the above embodiments employ the flat spiral spring 5, a screw type spiral spring 5a shown in FIG. 8 can be also used.

Figure 9:
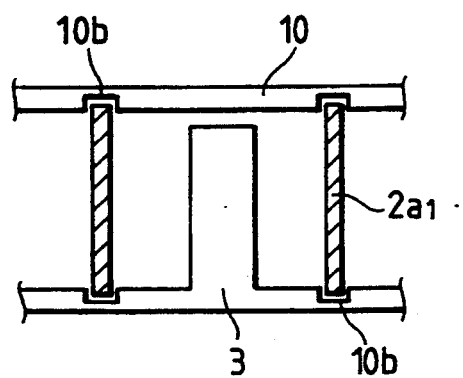
FIG. 9 is an enlarged, vertical, cross-sectional view showing a modified example of the auxiliary rotary member used in the connector apparatus of the present invention.
Figure 10:
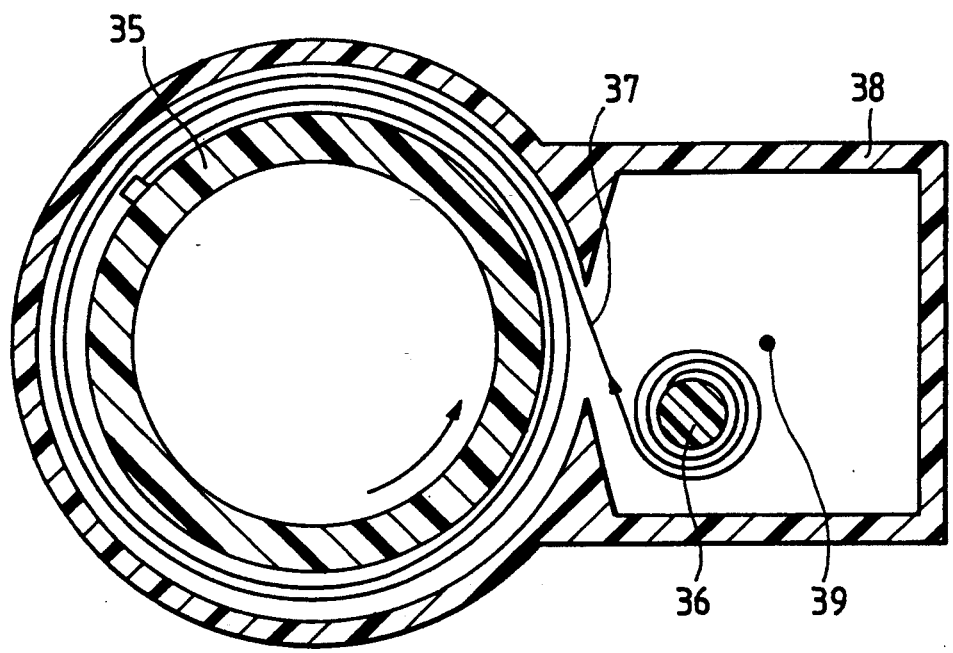
FIG. 10 is a horizontal cross-sectional view showing a connector apparatus previously proposed by the applicant.

Although the above embodiments provides the bearings 2a, 2a on the auxiliary rotary member 2 and the ridges 10a, 10a on the second compartment 10, it is also preferable that bearings 10b, 10b are provided on the second compartment 10 so that the cylindrical body $2a_1$ is loosely coupled into these bearings 10b, 10b, as shown in FIG. 9.

Furthermore, although the connector apparatus 100 explained in the above embodiments has the rotary member 1 and the auxiliary rotary member 2 rotating in the same direction, it is needless to say that the present invention can be applied to a connector apparatus having a rotary member and an auxiliary rotary member rotating in the opposite directions.

Next, a cable extracting mechanism in accordance with the present invention will be explained with reference to FIGS. 11 to 15.

Figure 11:
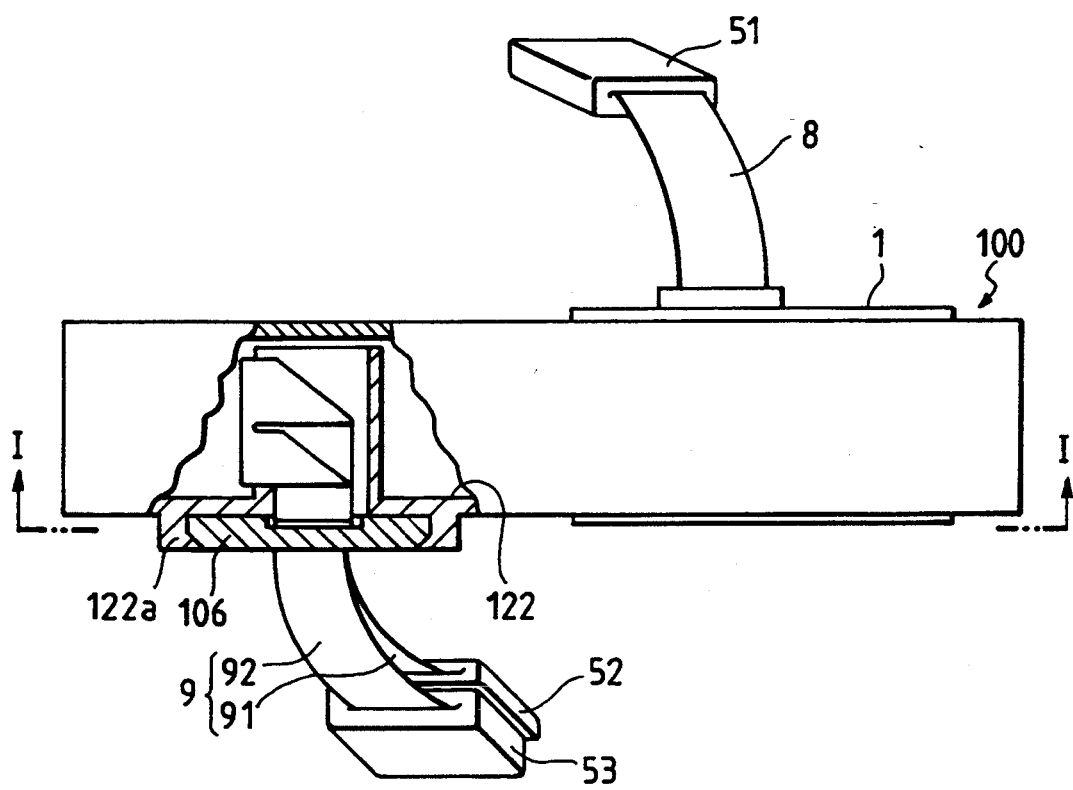
FIG. 11 is a partly sectional elevation view illustrating a cable extracting mechanism in accordance with the present invention.
Figure 12:
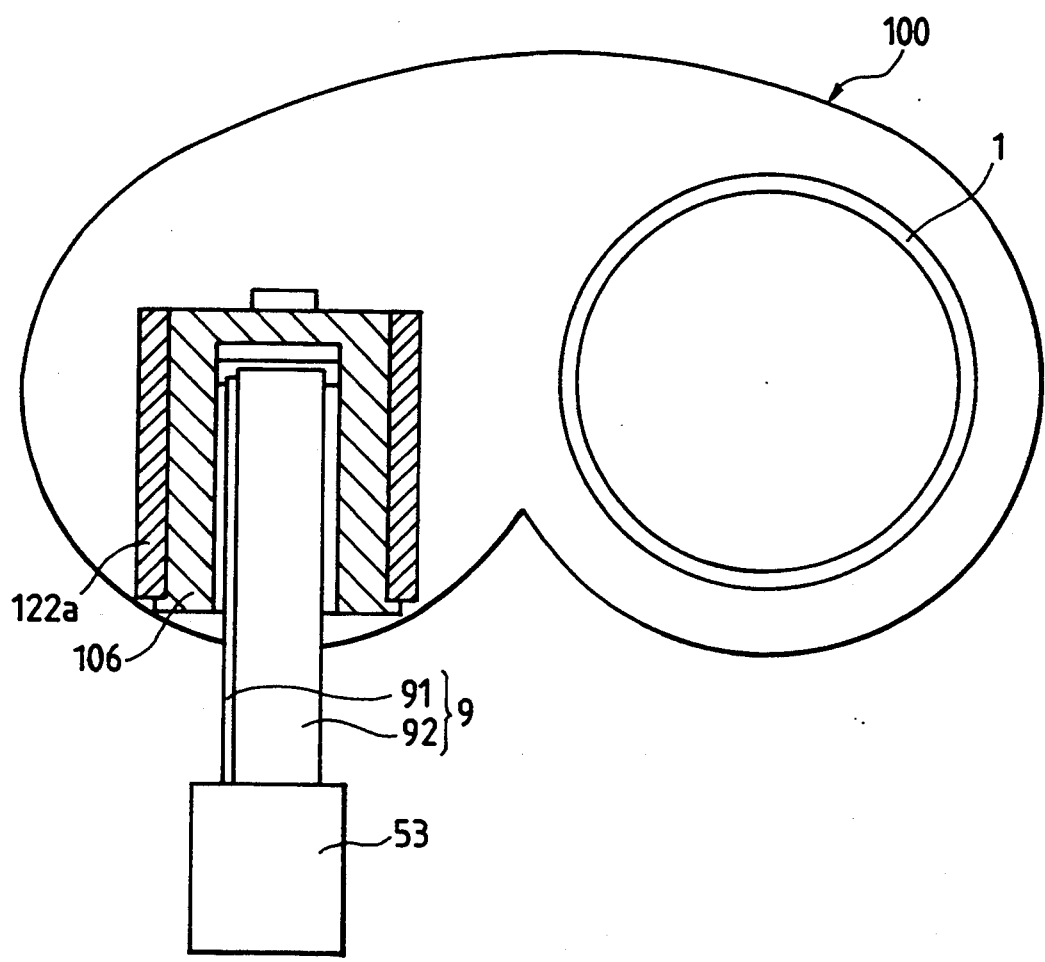
FIG. 12 is a partly sectional bottom view taken along a line I—I of FIG. 11.
Figure 13:
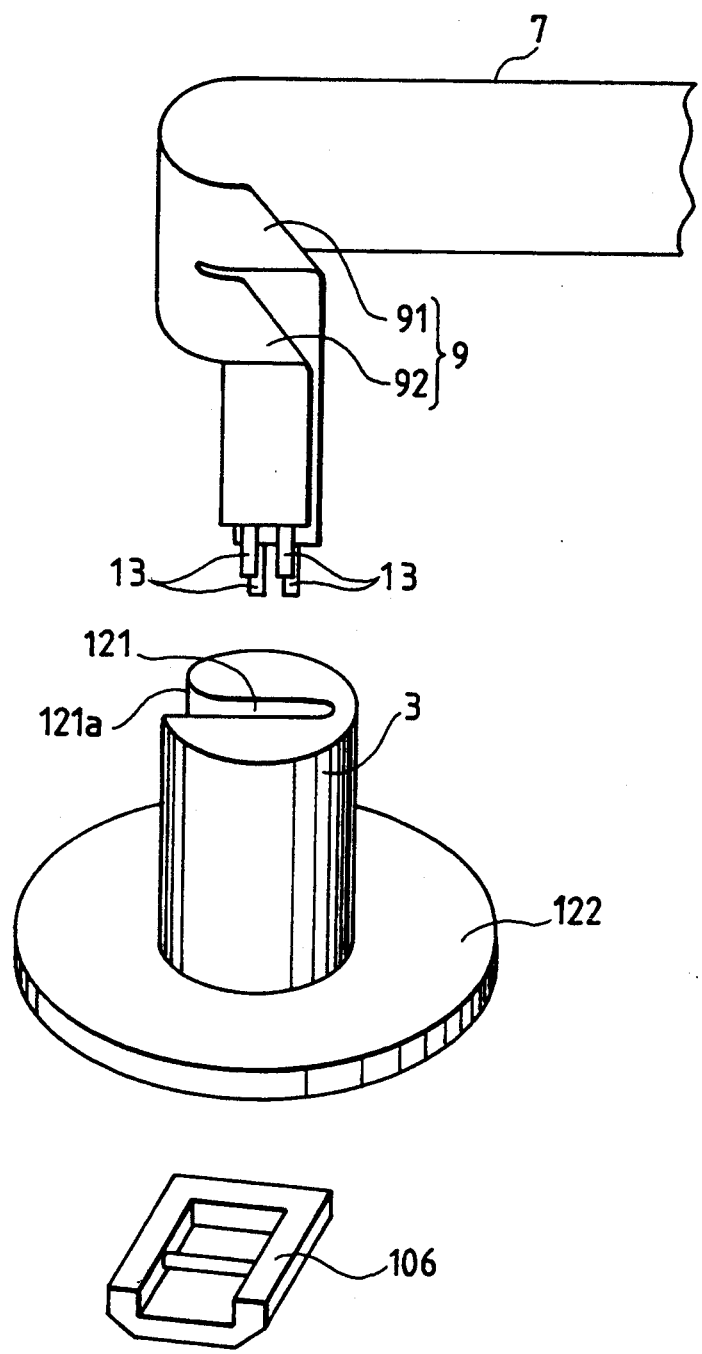
FIG. 13 is an enlarged, exploded, perspective view showing the cable extracting mechanism in accordance with the present invention.
Figure 14:
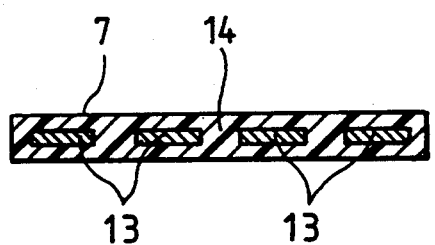
FIG. 14 is a cross-sectional view showing one example of the flat cable.

FIG. 11 is a partly sectional elevation view illustrating the cable extracting mechanism in accordance with the present invention. FIG. 12 is a partly sectional bottom view taken along a line I—I of FIG. 11. FIG. 13 is an enlarged, exploded, perspective view showing the cable extracting mechanism. FIG. 14 is a cross-sectional view showing another flat cable having four conductors.

As shown in FIG. 11, the connector apparatus 100 has the first connecting cable 8 having the first coupler 51 at the remote end thereof and the second connecting cable 9 (91 and 92) having second couplers 52, 53 at the remote end thereof. In this case, the flat cable 7 has a flexible flat body 14 of synthetic resin insulator and accommodates four conductors 13, 13, 13, and 13 disposed in parallel with each other therein, as shown in FIG. 14. This flat cable 7 is wound around the stationary member 3 plural times and extracted out of the casing of the cable connector apparatus 100 as the second connecting cable 9.

As shown in FIG. 13, the stationary member 3 has a cylindrical body protruding vertically upwardly from the center of a circular base plate 122 which serves as a bottom of the second compartment 10. The cylindrical stationary member 3 has a slit-like extracting hole 121 which extends in an axial direction of the cylindrical body of the stationary member 3. In other words, the slit-like extracting hole 121 is formed along a diameter or a chord of a cross section normal to the axis of the cylindrical body of the stationary member 3. More specifically, the slit-like extracting hole 121 has an upper end opening opened to the top of the cylindrical body of the stationary member 3, and a side end opening opened to the peripheral side wall of the cylindrical body of the stationary member 3. The upper end opening and the side end opening of the extracting hole 121 are continuously formed. Furthermore, the slit-like extracting hole 121 has a lower end opening opened to the bottom of the cylindrical body of the stationary member 3. The side wall of the cylindrical body of the stationary member 3 is roundly curved at an inlet (i.e the side end opening) of the slit-like extracting hole 121. This roundly curved portion serves as a cable guide portion 121a which smoothly guides the flat cable 7 into the slit-like extracting hole 121.

As shown in FIG. 13, the extended portion (i.e. the second connecting cable 9) of the flat cable 7 is split into two slender cables 91 and 92. Namely, the second connecting cable 9 consists of one slender cable 91 accommodating two conductors 13 and 13 and the other slender cable 92 accommodating the remaining conductors 13 and 13. Each of these slender cables 91 and 92 is bent downward with respect to the flat cable 7 extending horizontally. Then, the slender cable 91 is superposed on the other slender cable 92. Thus, the width of the second connection cable 9 becomes a half of that of the flat cable 7. A rectangular cover plate 106 is provided under the circular base plate 122 so as to define a cable extracting passage between the bottom of the base plate 122 and the cover plate 106. This cover plate 106 is slidably coupled in guide grooves 122a formed on the bottom of the base plate 122. And, this cover plate 106 has one end located beneath the lower end opening of the slit-like extraction hole 121 and the other end serving as an outlet of the cable extracting passage.

As shown in FIGS. 11, 12 and 13, the slender cables 91 and 92 of the second connecting cable 9, having passed through the slit-like extraction hole 121, are bent approximately 90 degrees being guided by the cover plate 106 and then extracted out of the casing of the cable connector apparatus 100 passing through the cable extracting passage defined by the cover plate 106. The remote ends of the slender cables 91 and 92 are connected to the second couplers 52 and 58, respectively.

This cable extracting mechanism is advantageous in that the cable is firmly held against a strong or impactive force because the cable is perpendicularly bent twice in total in the extracting hole 121 and the cover plate 106. Furthermore, since the width of the second connecting cable 9 is reduced into a half of that of the flat cable 7, the size of the stationary member 3 can be correspondingly reduced.

Figure 15:
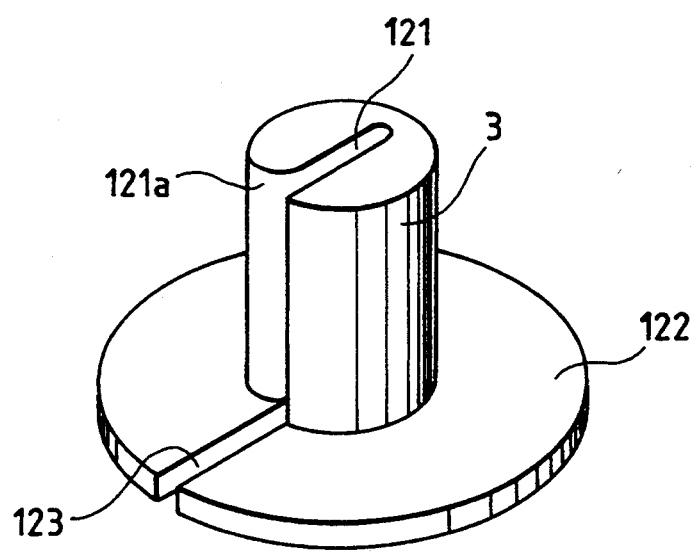
FIG. 15 is a perspective view showing another embodiment of the cable extracting mechanism in accordance with the present invention.

FIG. 15 is a perspective view showing another embodiment of the cable extracting mechanism. This embodiment is different from the above embodiment of FIGS. 11–13 in that a cutout 123 is further provided on the circular base plate 122. This cutout 123 extends radially and continuously formed with the slit-like extraction hole 121. With this arrangement the slender cables 91 and 92, already equipped with the couplers 52 and 53, can be installed into the slit-like extraction hole 121. Therefore, facilitation of cable installation will be feasible.

In the embodiment of FIG. 15, the Upper end opening of the slit-like extraction hole 121 can be omitted. Furthermore, a plurality of side end openings of the slit-like extraction hole 121 can be provided in the circumferential direction of the cylindrical body of the stationary member 3.

It is needless to say that the number of conductors 13, ..., 13 accommodated in the flat cable 7 is not limited to the particular number. Moreover, the cable extracting mechanism of the present invention can be applied to the first connecting cable 8 connected to the rotary member 1.

Figure 16:
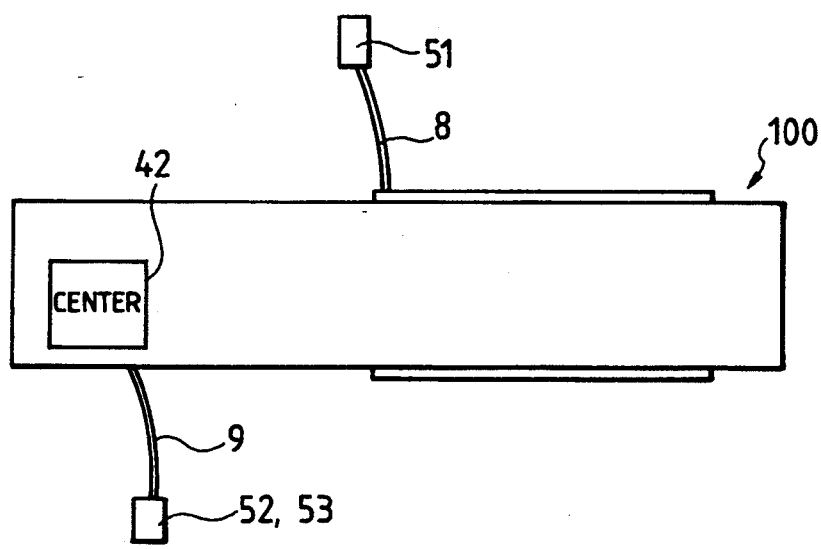
FIG. 16 is a view showing a transparent window provided on a side wall of the cable connector apparatus in accordance with the present invention.

Next, an improvement for facilitating the installation of the cable will be explained with reference to FIGS. 16–19. For realizing this, there is provided a transparent window 42 on the side wall of the casing of the cable connector apparatus 100, as shown in FIG. 16. Through this transparent window 42, a worker can monitor a mark 43 indicating a neutral position of the flat cable 7. Thus, the installation of the flat cable 7 is greatly facilitated.

Figure 17:
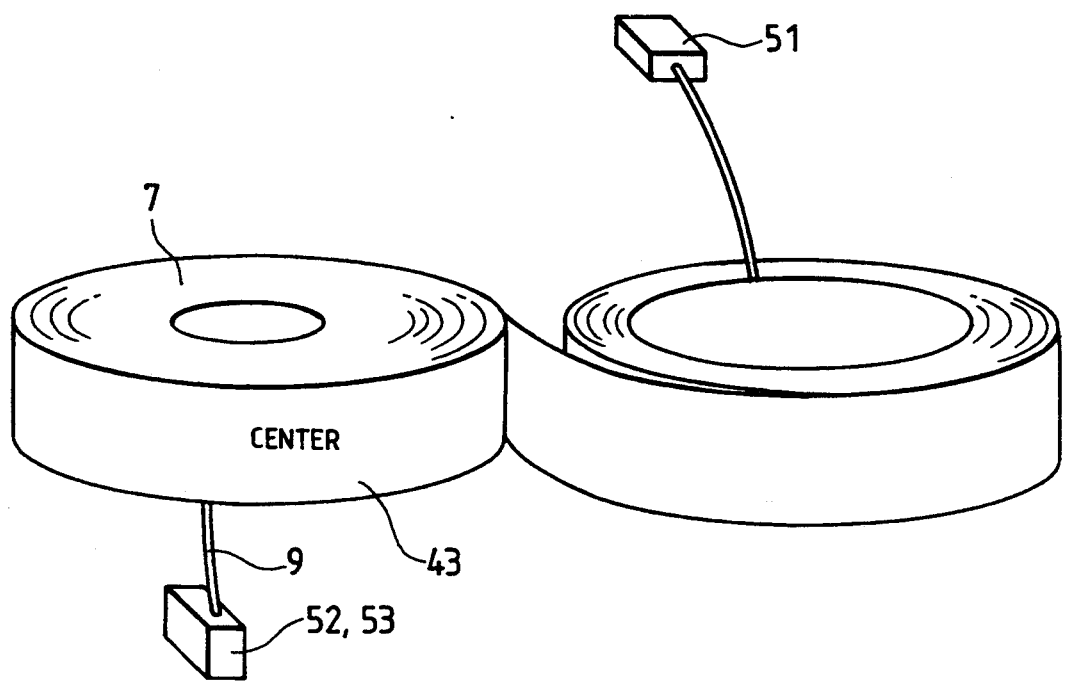
FIG. 17 is a view showing one example of a mark printed on the flexible cable.

Namely, as shown in FIG. 17, the mark 43 such as a word "center" is printed on the flat cable 7 so that this mark 43 just appears through the transparent window 42 when the flat cable 7 is in its neutral position.

Figure 18:
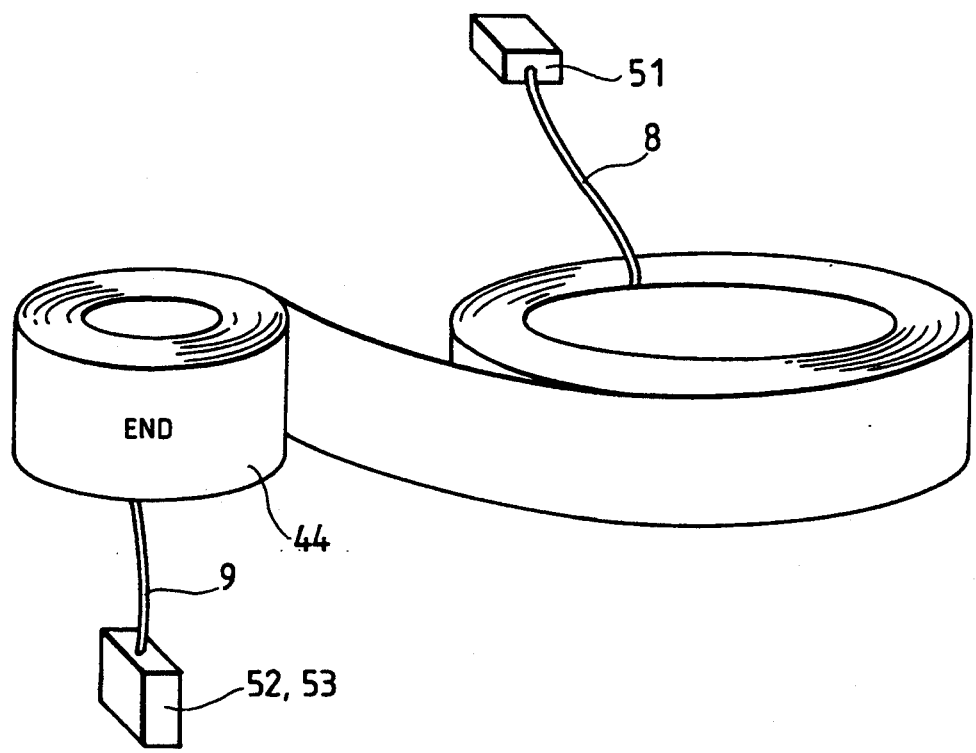
FIG. 18 is a view showing another example of the mark printed on the flexible cable.

FIG. 18 shows a similar example of the mark, wherein a mark 44 such as a word "end" indicating the end position of the flat cable 7 is printed on the flat cable 7.

Figure 19:
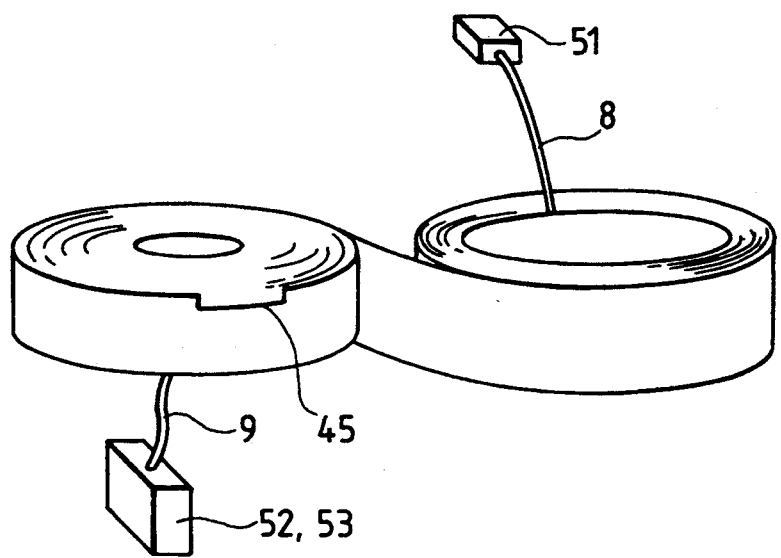
FIG. 19 is a view showing still another example of the mark, which is a cutout provided on the flexible cable.

Furthermore, the mark is not limited to particular words above explained. For example, a cutout 45 formed on the flat cable 7 can be used as a mark discriminating a position of the flat cable 7, as shown in FIG. 19.

Moreover, it is needless to say that the transparent window 42 can be provided on any of the first and second compartments 6 and 10.

Figure 20:
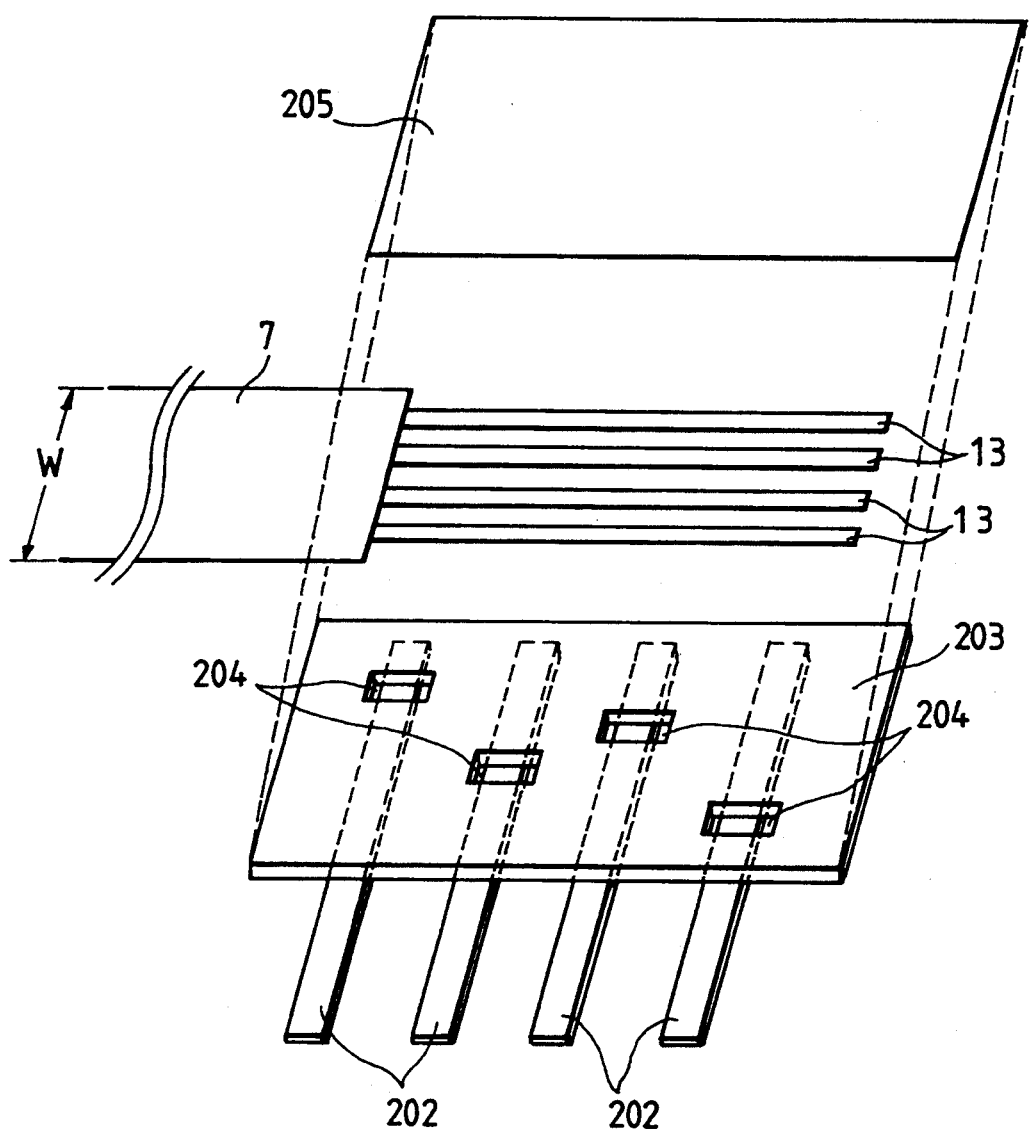
FIG. 20 is an exploded perspective view showing connecting structure of the flat cable and the rotary member.
Figure 21:
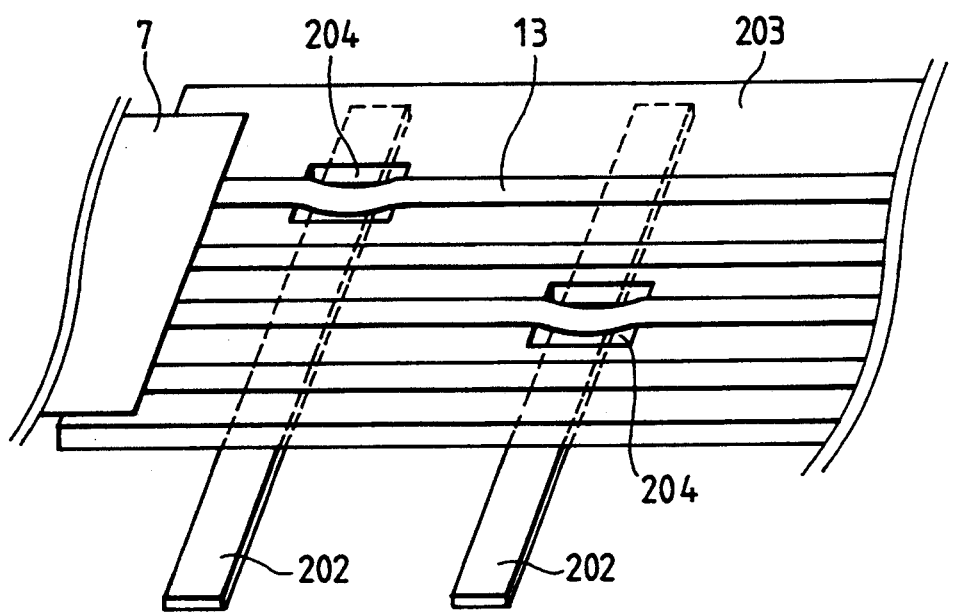
FIG. 21 is a perspective view schematically illustrating connecting condition between the flexible cable and the rotary member.
Figure 22:
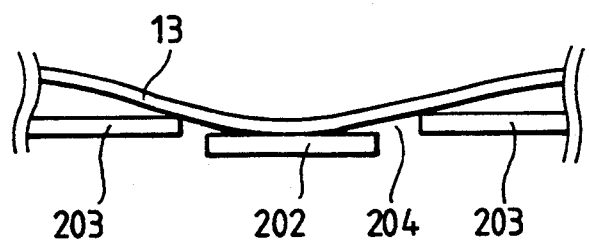
FIG. 22 is an enlarged cross-sectional view showing the connecting condition between the flexible cable and the rotary member.

Next, connecting structure of the flexible cable and the rotary member I will be explained with reference to FIGS. 20–26. FIG. 20 is an exploded perspective view showing connecting structure of the flat cable 7 and the rotary member 1. FIG. 21 is a perspective view schematically illustrating connecting condition between the flat cable 7 and the rotary member 1. FIG. 22 is an enlarged cross-sectional view showing the connecting condition between the flat cable 7 and the rotary member 1.

As shown in FIG. 20, the flat cable 7 accommodates a plurality of conductors 13, 13, 13, and 13 extending in parallel with each other in the longitudinal direction of the flat cable 7. There is provided an insulating sheet 203 accommodating terminals 202, 202, 202, and 202 provided as many as the conductors 13, 13, 13, and 13 of the flat cable 7. These terminals 202, 202, 202, and 202 extend in parallel with each other in a direction normal to the longitudinal direction of the flat cable 7. Therefore, the conductors 13, 13, 13, and 13 intersect with the terminals 202, 202, 202, and 202 over the insulating sheet 203 in a matrix shape. A plurality of holes 204, 204, 204, and 204 are opened on the insulating sheet 203, so that the terminals 202, 202, 202, and 202 are exposed only in these holes 204, 204, 204, and 204. Positions of these holes 204, 204, 204, and 204 are determined in such a manner that the conductors 13, 13, 13, and 13 of the flat cable 7 contact with corresponding terminals 202, 202, 202, and 202, respectively, in these holes 204, 204, 204, and 204.

Namely, when the conductor 13 of the flat cable 7 is placed on the insulating sheet 203, the conductor 13 can directly face with the corresponding terminal 202 through the hole 204. The conductor 13 is, therefore, electrically connected with this terminal 202 by spot welding or the like method. In accordance with the connecting condition shown in FIG. 21, the conductor 13 and the terminal 202 are connected perpendicularly. After completing connection, the flat cable 7 and the conductors 13, 13, ..., 13 are sandwiched by the above insulating sheet 203 and another insulating sheet 205 made of, for example, synthetic resin.

It should be noted that the present invention does not allow any two of these holes 204, 204, 204, and 204 to be placed on the same line and the same row. Accordingly, the arrangement of these holes 204 determines the relationship between the conductors 13, 13, 13, and 13 and the terminals 202,202,202, and 202 in such a manner that only one terminal 202 corresponds to only one conductor 13. This arrangement is advantageous in that layout of the holes 204, 204, 204, and 204 is determined freely and therefore the width W of the flat cable 7 can be reduced largely by selecting the best layout.

Figure 23:
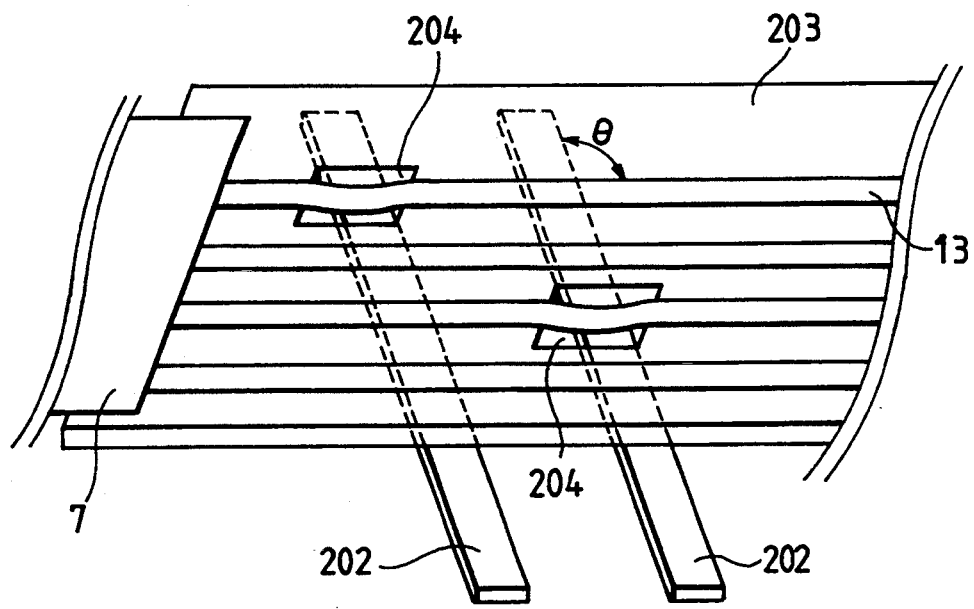
FIG. 23 is a perspective view schematically illustrating another connecting condition between the flexible cable and the rotary member.

FIG. 23 is a perspective view schematically illustrating another connecting condition between the flat cable 7 and the rotary member 1. As shown in this drawing, the conductors 13, 13, 13, and 13 intersect with the terminals 202, 202,202, and 202 at an angle 0. Such an inclined layout is suitable for the cable connector apparatus installed on the steering wheel of an automotive vehicle because the connecting cable 8 tends to interfere with the steering shaft 20. The above inclined layout can solve this problem.

Figure 24:
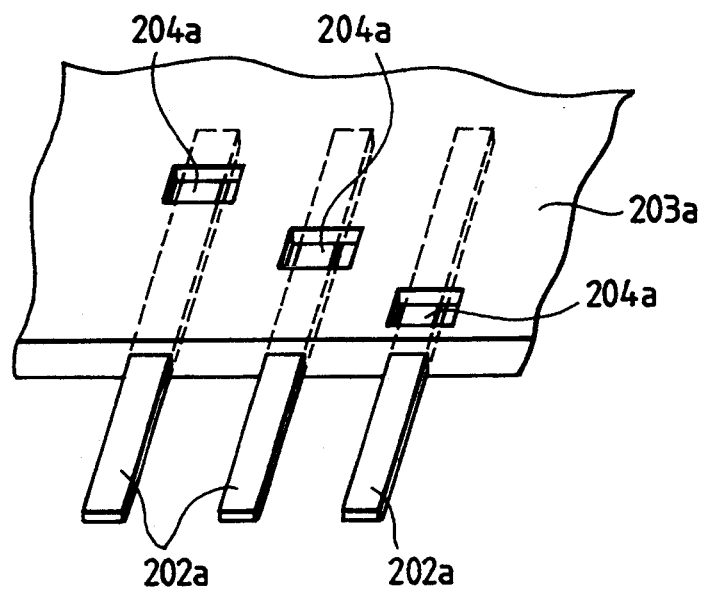
FIG. 24 is a perspective view schematically illustrating another connecting structure of the flexible cable and the rotary member.

FIG. 24 is a perspective view schematically illustrating another connecting structure of the flat cable 7 and the rotary member 1. According to this embodiment, terminals 202a, 202a, 202a, and 202a are molded together with an insulating sheet 203a. In this case, holes 204a, 204a, 204a, and 204a are opened on the upper surface of the insulating sheet 203a, so that the terminals 202a, 202a, 202a, and 202a are exposed from the bottom of the holes 204a, 204a, 204a, and 204a. The conductors 13, 13, 13, and 13 are welded with the terminals 202a, 202a, 202a, and 202a in the bottom of the holes 204a, 204a, 204a, and 204a.

Instead of terminals 202a, 202a, 202a, and 202a, it is also possible to mold the conductors 13, 13, 13, and 13 together with the insulating sheet 203a. Holes 204a, 204a, 204a, and 204a will be formed on the surface of the insulator sheet 203a in the same manner. In this case, the flexible flat body 14 of the flat cable 7 will qualify as the insulating sheet 203a since it is made of synthetic resin insulating material.

Figure 25:
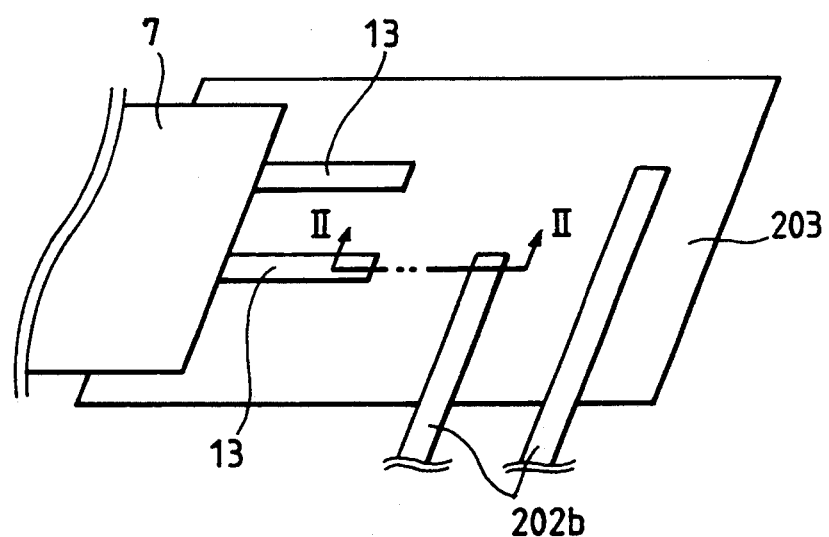
FIG. 25 is a perspective view schematically illustrating still another connecting structure of the flexible cable and the rotary member.
Figure 26:
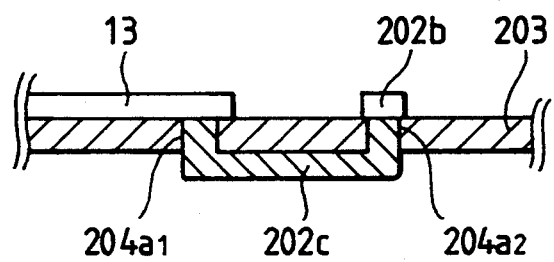
FIG. 26 is a cross-sectional view taken along a line II—II of FIG. 25.

FIGS. 25 and 26 are views schematically illustrating still another connecting structure of the flat cable 7 and the rotary member 1. According to this embodiment, both the conductor 13 of the flat cable 7 and the terminal 202 are provided on the upper surface of the insulating sheet 203. There are provided holes $204a_1$ and $204a_2$ beneath the conductors 13 and the terminals 202. There is further provided a connecting lead 202c between these holes $204a_1$ and $204a_2$ to electrically connect the conductor 13 with its corresponding terminal 202.

Namely, the connecting lead 202c is provided under the insulating sheet 203. The connecting lead 202c has both ends being received by the holes $204a_1$ and $204a_2$. Thus, each one of the conductors is electrically connected with its corresponding terminal. It is needless to say that the above connecting structure can be applied to the connection between the flat cable 7 and the stationary member 3.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meter and bounds of the claims, or equivalence of such meter and bounds are therefore intended to embraced by the claims.

What is claimed is:

1. A cable connector apparatus comprising:
   a case, defining first and second compartments therein;
   a rotary member accommodated in said first compartment;
   a stationary member accommodated in said second compartment;
   a flexible cable having one end connected to said rotary member and the other end connected to said stationary member, said flexible cable being wound around both said rotary member and stationary member plural times so as to allow said rotary member to turn on its axis several times;
   an auxiliary rotary member disposed around and radially spaced from said stationary member, said auxiliary rotary member having an engaging mechanism establishing engagement between said auxiliary rotary member and said flexible cable;
   said second compartment being separated into two spaces by said auxiliary rotary member, thereby dividing a flexible cable accommodated in said second compartment into inner and outer portions; and
   an elastic force assist means associated with said auxiliary rotary member so as to generate elastic force in response to rotation of said auxiliary rotary member.

2. A cable connector apparatus in accordance with claim 1, wherein said elastic force assist means is an elastic member wound around said stationary member and said elastic member causes elastic force to turn said auxiliary rotary member, thereby surely winding said flexible cable around said auxiliary rotary member when said flexible cable is unwound.

3. A cable connector apparatus in accordance with claim 1, wherein said engaging mechanism comprises a hole formed on said auxiliary rotary member, through which said flexible cable extends from inside to outside of the auxiliary rotary member.

4. A cable connector apparatus in accordance with claim 1, wherein said auxiliary rotary member has upper and lower circular bearings, and said second compartment has upper and lower circular ridges which are loosely coupled with said upper and lower circular bearings of said auxiliary rotary member.

5. A cable connector apparatus in accordance with claim 1, wherein said auxiliary rotary member has upper and lower circular ridges, and said second compartment has upper and lower circular bearings which are loosely coupled with said upper and lower circular ridges of said auxiliary rotary member.

6. A cable connector apparatus in accordance with claim 1, wherein said auxiliary rotary member has a cylindrical body and said elastic force assist means has one end connected to the stationary member and the other end connected to the auxiliary rotary member.

7. A cable connector apparatus in accordance with claim 6, wherein said elastic force assist means is a flat spiral spring having one end connected to the stationary member and the other end connected to the auxiliary rotary member, and said flat spiral spring is disposed along said flexible cable inside said auxiliary rotary member.

8. A cable connector apparatus in accordance with claim 1, wherein said auxiliary rotary member has a cylindrical body and a disk-like flange protruding inward from the cylindrical body inside said cylindrical body, thereby dividing an inside space of the auxiliary rotary member into upper and lower rooms.

9. A cable connector apparatus in accordance with claim 8, wherein said flexible cable is housed in one of said upper and lower rooms and said elastic force assist means is housed in the other of said upper and lower rooms.

10. A cable connector apparatus in accordance with claim 9, wherein said elastic force assist means is a flat spiral spring which is connected to the stationary member at one end and connected to said cylindrical body of the auxiliary rotary member at the other end.

11. A cable connector apparatus in accordance with claim 1, wherein said auxiliary rotary member has a cylindrical body, a disk-like flange protruding inward from said cylindrical body inside said cylindrical body, and a ringed flange protruding outward from said cylindrical body outside said cylindrical body, thereby dividing both an outside space and an inside space of the auxiliary rotary member into upper and lower rooms, respectively.

12. A cable connector apparatus in accordance with claim 1, wherein said flexible cable has an extended portion extracted out of said casing to serve as a connecting cable, and said connecting cable has a coupler at the remote end thereof.

13. A cable connector apparatus in accordance with claim 12, wherein said stationary member has a cylindrical body with a slit-like extracting hole which extends in an axial direction of said cylindrical body.

14. A cable connector apparatus in accordance with claim 13, wherein said connecting cable is split into a plurality of slender cables, each of these slender cables is bent downward with respect to the flexible cable extending horizontally, and these slender cables are superposed in the slit-like extracting hole.

15. A cable connector apparatus in accordance with claim 13, further comprising a cover plate defining a cable extracting passage, which is slidably coupled in guide grooves formed on a bottom of said casing, said cover plate has one end located beneath a lower end opening of said slit-like extraction hole and the other end serving as an outlet of said cable extracting passage, thereby extracting said connecting cable through said slit-like extracting hole and the cover plate.

16. A cable connector apparatus in accordance with claim 13, wherein said cylindrical body of said stationary member is roundly curved at an inlet of the slit-like extracting hole.

17. A cable connector apparatus in accordance with claim 12, wherein said stationary member has a cylindrical body protruding vertically upwardly from a center of a circular base plate serving as a bottom of said second compartment, and a slit-like extracting hole is formed on said cylindrical body.

18. A cable connector apparatus in accordance with claim 17, wherein said circular base plate has a cutout extending radially and continuously from said slit-like extraction hole.

19. A cable connector apparatus in accordance with claim 1, wherein said flexible cable has a mark thereon for discriminating a predetermined position of the flexible cable, and said case has a transparent window through which said mark is monitored.

20. A cable connector apparatus in accordance with claim 19, wherein said mark is a word printed on said flexible cable.

21. A cable connector apparatus in accordance with claim 19, wherein said mark is a cutout formed on said flexible cable.

22. A cable connector apparatus in accordance with claim 1, wherein said flexible cable accommodates a plurality of conductors extending in parallel with each other in a longitudinal direction of said flexible cable and has an improved connecting arrangement at an end thereof, said connecting arrangement comprising: a plurality of terminals provided as many as said conductors of said flexible cable, said terminals extending in parallel with each other in a direction different from the longitudinal direction of the flexible cable; and an insulating sheet interposing between said conductors of said flexible cable and said terminals, said insulating sheet having a plurality of holes opened thereon through which said conductors of said flexible cable are connected with corresponding terminals.

23. A cable connector apparatus in accordance with claim 22, wherein said conductors of said flexible cable and said terminals are covered by an insulating sheet after completing connection.

24. A cable connector apparatus in accordance with claim 22, wherein said conductors of said flexible cable are inclined with respect to said terminals.

25. A cable connector apparatus in accordance with claim 22, wherein said terminals are molded together with said insulating sheet.

26. A cable connector apparatus in accordance with claim 22, wherein said insulating sheet is a flexible flat body of said flexible cable, and said conductors are molded together with this flexible flat body of said flexible cable.

27. A cable connector apparatus in accordance with claim 1, wherein said flexible cable accommodates a plurality of conductors extending in parallel with each other in a longitudinal direction of said flexible cable and has an improved connecting arrangement at an end thereof, said connecting arrangement comprising:
  a plurality of terminals provided as many as said conductors of said flexible cable, said terminals extending in parallel with each other in a direction different from the longitudinal direction of the flexible cable;
  an insulating sheet disposed under said conductors of said flexible cable and said terminals, said insulating sheet having holes located beneath said conductors and terminals; and
  a connecting lead provided under said insulating sheet, said connecting lead having both ends received by said holes, thereby electrically connecting each one of said conductors with its corresponding terminal.

* * * * *